United States Patent [19]

Chauvin

[11] Patent Number: 4,500,550

[45] Date of Patent: Feb. 19, 1985

[54] CHEESE WITH MICRO-ORGANISM—CAUSED DECORATION ON ITS RIND AND PROCESS FOR PRODUCING SAME

[75] Inventor: Bernard Chauvin, Bauge, France

[73] Assignee: Bongrain S.A., Guyancourt, France

[21] Appl. No.: 480,145

[22] Filed: Mar. 29, 1983

[30] Foreign Application Priority Data

Mar. 31, 1982 [FR] France ............................. 82 05571

[51] Int. Cl.$^3$ ............................................. A23C 9/12
[52] U.S. Cl. ......................................... 426/38; 426/36; 426/37; 426/42; 426/43; 426/249; 426/250; 426/383; 426/582; 435/243
[58] Field of Search ................... 426/36, 37, 38, 42, 426/43, 249, 250, 383, 582

[56] References Cited

U.S. PATENT DOCUMENTS

| | | | |
|---|---|---|---|
| 545,294 | 12/1894 | Hunter | 426/249 |
| 1,429,405 | 9/1922 | Otter et al. | 426/249 |
| 2,786,762 | 7/1950 | Knight | 426/37 |
| 3,973,042 | 8/1976 | Kosikowski et al. | 426/37 |
| 4,421,773 | 12/1983 | Akutagawa | 426/249 |

FOREIGN PATENT DOCUMENTS 1230517  5/1971  United Kingdom.

*Primary Examiner*—Sam Rosen
*Attorney, Agent, or Firm*—Fleit, Jacobson, Cohn & Price

[57] ABSTRACT

To obtain a permanently and indeliby decorated cheese whose decoration forms an integral part of the rind and is inseparable therefrom, a sunken graphic pattern (means of identification and/or for defining portions thereof) is impressed on one of the faces, more especially by means of a printing draining board, at an advanced stage of draining, then different colorations are produced, particularly in the hollows of the graphic pattern and on the flat parts of said face, by growth of different micro-organisms during maturing. Thus, a decorated cheese is obtained.

11 Claims, 6 Drawing Figures

CHEESE WITH MICRO-ORGANISM—CAUSED DECORATION ON ITS RIND AND PROCESS FOR PRODUCING SAME

The invention relates to the decoration of cheeses, more particularly with a view to their identification. It relates more particularly to cheeses bearing permanent and indelible patterns for identifying and/or for defining portions thereof, processes for obtaining same and devices for implementing these processes.

In particular, to comply with the requirements of the law, such as compulsory labelling, cheeses are normally sold with identification means such as:
  a printed label stuck to the cheese,
  printed wrapping paper,
  outer package printed or provided with a printed label,
  a special characteristic shape of the type of cheese concerned or protected, particularly by a trade mark,
  brand mark printed in the cheese on one or both faces (for example gruyère or cheese of the Pyrenees) or on the heel portion (peripheral surface), for example "raclette" (cheese fondue),
  molten casein mark in the rind of the cheese for some cooked, essentially pressed, paste cheeses of controlled origin,
these identification means being possibly combined.

Moreover, some cheeses such as specialities to be cut into portions are provided with a label defining portions thereof, whereas others have a special shape to facilitate cutting them up into portions. Finally, there also exist cheeses, essentially fresh or soft or molten paste cheeses which are sold in precut portions, wrapped and packed in a box, such for example as cream cheeses.

The identification means such as labels, wrapping papers and printed boxes which in general have an attractive appearance disappear when the cheese is placed in the cheese board. Furthermore, the brand marks which, because of the method of applying them, are only met with one certain largesized pressed paste cheeses such as gruyère or raclette and which can only be given rough shapes without any attractive character, are divided by being cut at the time of purchase by the consumer and can then no longer serve for identifying the cheese. There exist then no "bare" cheeses attractively and indelibly decorated.

The aim of the invention is to provide such a cheese. It has more particularly as object a permanently and indelibly decorated cheese, characterized in that its decoration, forming an integral part of the rind and inseparable therefrom, has at least two different colorations obtained by growth of different micro-organisms.

In a particularly simple embodiment, the decoration of the cheese results from the fact that the heel portion has a different coloration from that of at least one of the faces. This difference in coloration is obtained by growth, during maturing, on the heel portion of peripheral surface and the face or faces which it is desired to colour differently, of micro-organisms producing different colours.

Figure 1:
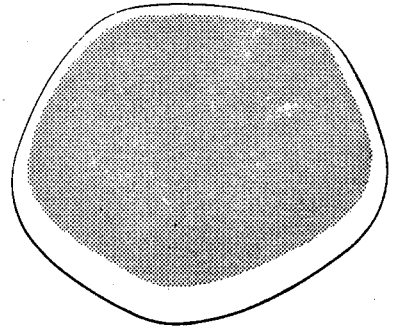
FIGS. 1 and 3 show examples of the design on cheese.

FIG. 1 of the accompanying drawings shows a soft paste cheese, the decoration of which results from the different coloration of one of its faces and of the peripheral surface by different micro-organisms, the other face, not shown, being able to be coloured in the same way as the peripheral surface or as the first face, and may even have a different coloration from the two preceding ones.

In the particular case of FIG. 1, the peripheral surface is coloured white by growth of the mould *Penicillium candidum*, whereas the visible face, with washed rind, is given an ochre colour by growth of bacteria of the *Bacterium linens* type.

This particularly simple embodiment of the invention only allows however a limited range of different colour combinations, but more especially it does not provide graphic patterns serving for example as identification and/or for cutting up into portions.

According to another embodiment offering wider possibilities, the invention provides a decorated cheese, one of whose faces at least and/or the peripheral surface comprises a substantially flat surface in which is incorporated a sunken or relief graphic pattern, the substantially flat surface and the graphic pattern being coloured differently.

To manufacture a decorated cheese, in accordance with the invention, bearing a sunken or relief graphic pattern, recourse may be had to the process characterized in that it comprises:
  a step consisting in impressing, before maturation and preferably at an advanced stage of draining, a graphic pattern on a substantially flat surface of at least one of the faces and/or the peripheral surface, and after impressing this graphic pattern
  a step consisting in producing different colorations on the substantially flat surface and on the graphic pattern by growth of different micro-organisms, during maturation.

The graphic pattern may be impressed by any means providing an impression which does not disappear during maturation and the different subsequent treatments. In particular, the "hollows" or "reliefs" must have a minimum thickness which depends to a large extent on the type of cheese manufactured and the subsequent treatments. A man skilled in the art will be able to readily determine in each case, by simple previous tests, the thickness of the graphic pattern to be applied.

To form a relief impression, a plate or a printing draining board may be used on which a symmetrical graphic pattern, with respect to a plane, of the graphic pattern to be impressed formed more especially of letters, appears engraved in the useful face. However, so that the cheese may penetrate thoroughly into the graphic pattern under the effect of its weight and possibly under the effect of an external pressure or depression and thus keep the relief impression of this graphic pattern, it is very desirable for the pattern to be formed by recesses in the plate or the draining board; thus, the types of graphic patterns which may be satisfactorily impressed in relief are limited in number. It is a question essentially of letters and of simple geometrical shapes.

On the other hand, the impression of a graphic pattern sunken in one of the faces or in the peripheral surface by means of a printing device bearing in relief the symmetrical graphic pattern, with respect to a plane, of the graphic pattern to be impressed, is effected more readily, for then it is the relief pattern which penetrates into the cheese and it may leave therein an indelible impression, even when its structure is relatively fine and complex.

It is then preferred to form a sunken impression on the peripheral surface or else preferably on one of the faces at least of the cheese. In this latter case, in particular, it is not necessary to exert an external pressure for efficiently impressing the graphic pattern.

Therefore, in a particularly advantageous embodiment, a sunken graphic pattern is impressed in a substantially flat surface of the heel portion or of one of the faces and the substantially flat surface and the sunken graphic pattern are coloured differently by growth of different micro-organisms.

To apply a sunken graphic pattern, particularly if it is relatively simple, to one of the faces of the cheese, a printing plate limited to the pattern to be impressed may be inserted, more especially during the final draining phase, between the usual draining slats and the cheese.

According to a particularly advantageous and preferred embodiment of the invention, to apply a sunken graphic pattern to one of the faces of a cheese, a printing draining board is used, preferably at an advanced stage of draining, particularly during the last stage, comprising in relief the graphic pattern, symmetrical with respect to a plane, of the graphic pattern to be printed.

Figure 2:
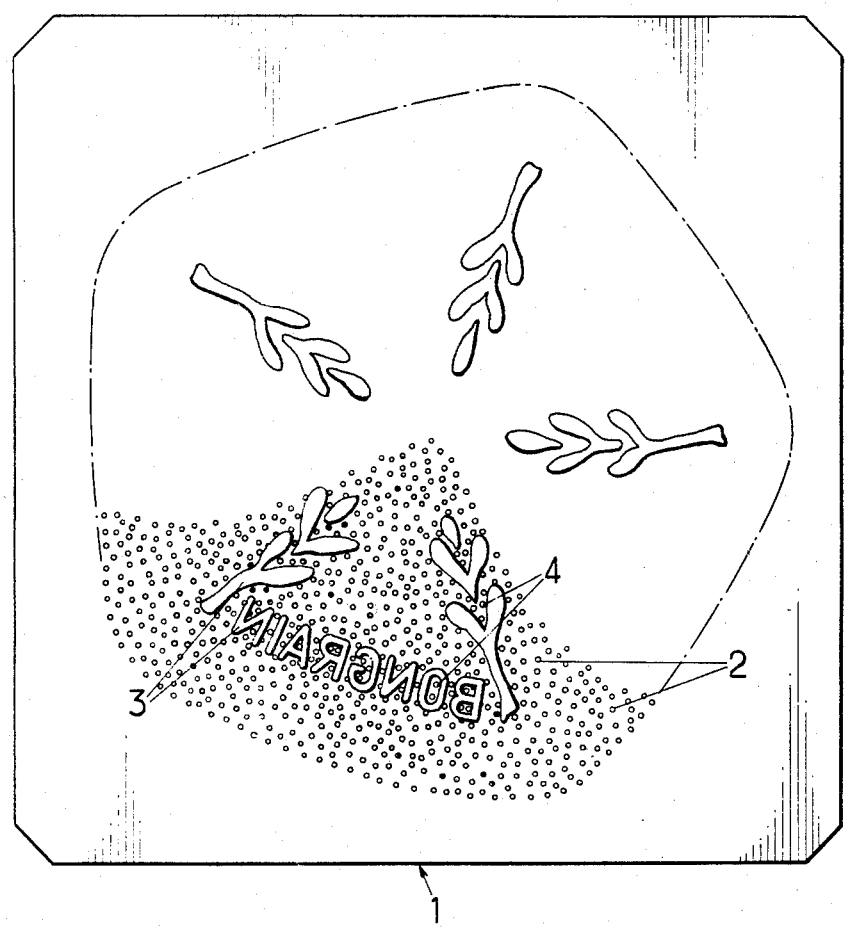
FIG. 2 is a printing draining board.

FIG. 2 shows schematically and in a top view the useful face of one example of such a printing draining board for impressing a sunken graphic pattern. This board comprises essentially a perforated plate 1, preferably semi-rigid, made from a material resisting advantageously, among other things, wear, shocks, deformation and daily industrial washing, such as polypropylene.

This plate which may have the final dimensions and shape desired for the cheese comprises, at least in its useful part shown partially in FIG. 2, a multitude of perforations 2 and bears, on at least one of its faces, a graphic pattern 3, shown partially, in relief and symmetrical with respect to a plane, of the graphic representation to be impressed serving both for defining the portions (schematized branches) and for conveying the mark of the manufacturer (here by way of example the registered mark BONGRAIN shown for the sake of simplicity on only one of the "portions"). This relief pattern of the draining board may be provided by deformation of the plate, for example by stamping; in this case, it is in relief on the useful face but sunken on the other face. It may also be provided by adding material (forming the plate or similar); then the pattern only appears on the useful face.

However it may be and whatever the embodiment of the graphic pattern on the board, the pattern must have a structure such that it is capable of being indelibly impressed in the cheese when it is placed in contact therewith, particularly at an advanced draining stage.

The distribution of the perforations 2 and their size are advantageously such that the face of the cheese treated by means of the printing draining board appears smooth and flat outside the printed graphic pattern, so that, during maturing on slats, the graphic pattern may be protected by this flat bearing surface.

For this, the perforations 2 have preferably a diameter of 1.5 to 2.5 mm and a density of 5 to 8 perforations per cm$^2$.

It is important for the zones of the board very close to the different parts of the pattern, for example inside the letters, to comprise perforations 4 of the order of 1 to several millimeters in diameter. These perforations allow the air to escape during contact of the board with the cheese and an even and complete graphic pattern to be obtained on the cheese.

The perforations 2 and 4 of the board, identical or different, may have a cylindrical shape but are however conical, more especially perforations 4.

The relief parts of the board (graphic pattern) do not as a rule comprise any perforations.

For forming the impression, preferably at an advanced stage of draining, the cheese is placed on the useful face of the board. The impression is then made under the effect of the weight of the cheese without any other pressure means. It is sufficient for that for the time in which the cheese and the board remain in contact to be sufficient for the paste forming the cheese to make good contact with the "flat" parts of the board and for the normal draining of the cheese to be practically finished.

Thus, with the printing draining board of the invention, a sunken impression may more especially be formed in one or both faces of the cheese.

For example, to form an impression on both faces, the cheese can be sandwiched between two boards while applying a pressure, or the cheese may be turned over during an advanced draining stage, more especially the last one.

However, essentially for practical reasons, it is preferred to form a sunken impression on only one face of the cheese.

Figure 3:
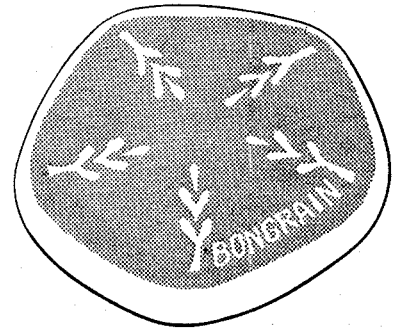

Very varied graphic patterns may be applied by means of a printing draining board. They may be formed of prescribed or fanciful inscriptions, or drawings which may be original or not. These patterns may more especially reproduce registered trademarks and/or means for defining portions of the cheese. With the printing draining board shown in FIG. 2, a cheese may be obtained bearing a graphic pattern reproducing both a registered trademark and defining portions thereof, such as shown in FIG. 3.

In another advantageous embodiment of the invention, the graphic pattern is impressed in the peripheral surface.

To achieve this impression, devices may be used more especially for gripping round the cheese, being applied to at least a part of the peripheral surface and bearing on the parts coming into contact with the peripheral surface of the cheese the graphic pattern in relief, symmetrical with respect to a plane, of the graphic pattern to be impressed into this peripheral surface.

Figure 4:
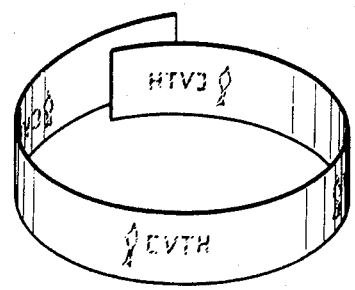
FIGS. 4–6 show devices for making peripheral impressions on cheese.
Figure 5:
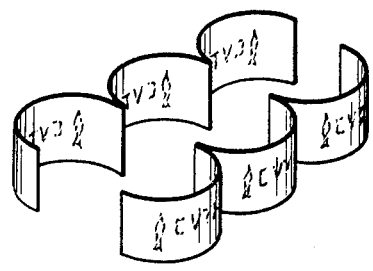
Figure 6:
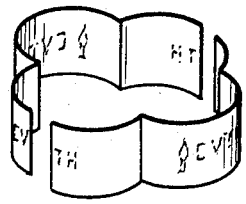

FIGS. 4, 5 and 6 show in a non limiting way examples of such devices.

FIG. 4 shows a semi-rigid, flexible strip made of polypropylene, for example, for applying to the peripheral surface of a cheese having a substantially round shape for a period of time sufficient for the pattern to be indelibly impressed, possibly during the whole period of draining. This strip does not need to have perforations as did the board used for printing the faces.

FIG. 5 shows a rigid assembly formed for example from polypropylene or polyethylene for printing several cheeses at the same time (here 3). It is formed from two series of "half shells" coupled together and bearing inside a relief graphic pattern. Advantageously, this assembly has the final height desired for the cheese. It may then serve as a mould and be kept in place until after salting.

Finally, FIG. 6 shows a peripheral surface printing device for a cheese having a special shape comprising a symmetry (here a "four petal" shape). It is formed, like the device of FIG. 5, from two "half-shells" made from a rigid material and has advantageously a height close to the final height desired for the cheese to be printed. This device is used under the same conditions as that of FIG. 5.

Whatever the graphic pattern impressed on the cheese and the embodiment thereof, in a subsequent step different colorations are produced on the pattern and the substantially flat surface on which it is printed, by growth of different micro-organisms, during maturation.

It is known that the natural coloration of cheeses is due to the growth of micro-organisms such as bacteria, yeasts, moulds which develop spontaneously or after seeding, during maturing.

Thus, on cheeses with a bloomed rind such as camembert, there develop moulds giving a white or bluish "bloom" whereas on cheeses with a "washed rind" such as munster there develop bacteria which give on ochre tinted or reddish rind for example.

Of course, as was pointed out above, in the simple case where the decoration of the cheese results from the simple juxtaposition of at least two different colorations of the faces and on the peripheral surface, micro-organisms may for example be caused to grow on these different parts of the cheese giving different colorations, for example bacteria on one of the faces or on both ("washed rind") and moulds on the peripheral surface and possibly the other face ("bloomed rind"), or conversely.

However, a decoration is obtained which is often more useful and attractive if the impression of a graphic pattern, preferably sunken, is combined with coloration differences between the pattern and the flat surrounding surface.

Thus, for example, in the preferred case of a cheese, particularly a soft paste, comprising on one of its faces a sunken graphic pattern for identification purposes and/or for defining portions thereof, a mould may be caused to grow, for example of the Penicillium type in the hollows whereas on the flat part of the face a bacteria is caused to grow, for example of the *Bacterium linens* type ("washed rind"). Thus, a cheese is obtained having one face clearly marked with two colours (FIG. 3).

As moulds which may be used for giving a coloration to the rind of cheeses in accordance with the invention, there may be mentioned by way of examples:

*Penicillium candidum*, which gives a white coloration,

*Geotricum candidum*, which gives a white-pink coloration,

*Penicillium glaucum*, which gives a bluish coloration.

As bacteria which may be used for giving a coloration to the rind of cheeses according to the invention, there may be mentioned by way of example:

*Bacterium linens* which gives an ochre coloration.

These moulds and/or bacteria may be combined together for colouring the decorated cheeses of the invention, to the extent that they give different colorations.

The invention will be better understood from the following detailed non limiting examples of implementation of the invention.

EXAMPLE 1

Preparation of a soft paste cheese, with a sunken pattern on one of its faces which has been given two colours by growth of different mirco-organisms A. Impression of the pattern After moulding the cheese in the usual way in individual moulds or in mould blocks, draining begins. This comprises a first turning over, in general within the first hour, then a second turning over, very often four to six hours after moulding, these times being obviously variable depending on the types of products produced.

During the first draining phase, the cheese may be turned over a variable number of times but frequently it is only turned over twice during this first draining phase, the second taking place when:

the volume of the cheese is close to the final volume desired;

the cohesion of the cheese is sufficient to reduce risks of damage by dropping in the mould (pan);

exudation of serum is extremely limited; and the cheese is warm, supple and malleable.

In general, at this stage acidification of the product is not finished. The cheese must remain at rest in its mould for several hours (generally at least 10 ) before being finally removed from the mould then salted.

When the cheese is turned over for the last time, that is in most cases when it is turned over for the second time after about 4 to 6 hours, the printing draining board replaces the draining board initially used and it is on the printing draining board that draining continues until the cheese is removed from the mould, in most cases, about twenty-four hours after the last turning over when the printing draining board was placed in position.

After removal from the mould and removal of the printing draining board, salting is carried out, either in a brine bath or with fine salt. Cooling the cheese to a temperature of about 12° C. before or during salting gives the paste a firmer consistency, which contributes to keeping intact the impression obtained during the last draining stage. At this stage, the pattern is well impressed into the face, elsewhere flat and practially smooth, of the cheese which was in contact with the printing draining board.

It also is possible to make the impression when the cheese has been removed from the mould. After removal from the mould, the cheese may then be advantageously placed on the printing face of the printing draining board, itself placed directly on a slatted salting tray, in particular in the case of salting in a brine bath. It is advantageous to proceed in this fashion when the whole of the different draining phases is very limited in time, particularly when soft paste cheeses are manufactured by a process in which the mechanical work of draining the curdled milk is accentuated, for example in the case of "multiple tank" manufacture with washing of the curdled milk.

B. Maturing and giving emphasis to the impression

Giving emphasis to the impression in the cheese, such for example as the one shown in FIG. 3, is provided by the development of different micro-organisms in the impressed "hollows" and on the practially flat part of the printed face. For example (case of the cheese shown in FIG. 3) in the hollows and on the peripheral surface a mould of the Penicillium type is caused to develop, for example *Penicillium candidum* which gives a white coloration, and on the flat parts of the treated face is caused to grow a bacteria, for example *Bacterium linens*, called "ferment of red", which gives an ochre coloration.

After salting, the cheese is seeded by spraying over the whole of its surface with *Penicillium candidum*. The maturing phase begins in the drying room. At this stage, the pH of the surface of the cheese close to 5 is favourable to the proper development (germination and then growth) of *Penicillium candidum*. About the fifth or sixth day, *Penicillium candidum* appears over the whole surface; it is then very fragile because it is not well fixed to the rind, but it attaches itself thereto very quickly. From about the seventh day, the printed face of the cheese may be rubbed for the first time. The implantation of *Penicillium candidum* has contributed to increasing the pH of the rind of the cheese so as to bring it to a value promoting development of the ferment of red (pH close to 6 and above).

Rubbing is carried out under conditions such that only that flat parts of the face are touched, whereas implantation of *Penicillium candidum* continues in the sunken parts of the printed graphic pattern.

Rubbing destabilizes *Penicillium candidum* (momentary destruction) and then *Bacterium linens* which is in competition with *Penicillium candidum* to "occupy the ground" begins to develop. During the following days, *Penicillium candidum*, in full growing phase, develops again over the rubbed parts and it is necessary to repeat the rubbing operation generally every 48 hours until *Bacterium linens* or "ferment of red" appears generally over the rubbed parts of the cheese. About the eleventh or twelfth day of maturation, *Penicillium candidum*, destroyed on several occasions, is no longer likely to develop again over the rubbed parts (phase of decline in growth and pH has become too high). Conversely, since the pH of the rind has become favourable to the proper development of bacterium linens, this latter appears and rapidly occupies the whole rubbed area of the cheese.

After about twelve to fourteen days, selection of the flora is made and the expected result is reached: The cheese appears to have an ochre colour which is accentuated with the progressive development of *Bacterium linens* over the rubbed areas, and white in colour in the engraved impression causing the patterns to stand out very clearly. *Penicillium candidum* is at that time well "attached" to the cheese. The cheese thus obtained is shown in FIG. 3.

The peripheral surface and the other face are each coloured like the graphic pattern or the flat part of the decorated face, depending on the treatment which it is desired they undergo.

EXAMPLE 2

Preparation of a pressed paste cheese with a sunken pattern on-one of its faces, bicoloured by growth of different micro-organisms On leaving the press, the moulded cheese which is still warm and supple remains in the draining room so as to extend the acidification for ten hours or so in general, even more. In this case, the impression of the cheese may be advantageously made during this rest period by simply placing the cheese on a printing draining board or a printing plate until it is finally removed from the mould or before salting.

The next steps of the manufacture of the cheese are accomplished as in example 1.

EXAMPLE 3

Preparation of a soft paste cheese, with a sunken pattern, on the peripheral surface, bicoloured by growth of different micro-organisms The impression of the graphic pattern on the peripheral surface is carried out by devices such as those shown in FIGS. 4, 5 and 6 of the accompanying drawings, which were described above.

As a general rule, the printing device such for example as one of those shown in FIGS. 4, 5, 6 which comprises a graphic pattern in relief on its inner part, embraces the cheese while exerting thereon a pressure. It may be positioned, as in the case of examples 1 and 2, at an advanced draining stage. Advantageously however, particularly when it is a question of a rigid block of the type shown in FIGS. 5 and 6 which have preferably a height close to the final height of the cheese, it remains in position during salting and it is only withdrawn when this latter is finished.

The subsequent operation for maturing and for giving emphasis to the impression are achieved similarly to what was described in example 1.

EXAMPLE 4

Preparation of a soft paste cheese whose decoration is formed by a colouring difference between the peripheral surface and at least one of the faces To obtain such a cheese shown for example in FIG. 1, the procedure is as described in example 1, except that the step for printing one of the faces is omitted.

I claim:

1. A permanently and indelibly decorated cheese, characterized in that its decoration, forming an integral part of the rind and inseparable therefrom, has at least two different colorations obtained by growth of different micro-organisms said micro-organisms being caused to develope on said cheese in a predetermined pattern.

2. The cheese according to claim 1, characterized in that its peripheral surface has a coloration different from that of at least one of its faces.

3. The cheese according to claim 1, characterized in that at least one of its faces and/or its peripheral surface comprises a substantially flat surface in which is incorporated a sunken or relief graphic pattern and in that the substantially flat surface and the graphic pattern are coloured differently by growth of different micro-organisms.

4. The cheese according to claim 3, characterized in that one of its faces is formed by a substantially flat surface in which is incorporated a sunken graphic pattern.

5. The cheese according to claim 3, characterized in that is peripheral surface comprises a substantially flat surface in which is incorporated a sunken graphic pattern.

6. A process for manufacturing the cheese of claim 3 which comprises impressing, before the cheese matures, a graphic pattern on at least one substantially flat surface and/or a peripheral surface of the cheese and then producing different colorations on the surface of the cheese and on the graphic pattern by the growth of different colored micro-organisms during maturing.

7. The process according to claim 6, characterized in that the micro-organisms are chosen from: *Penicillium candidum, Geotricum candidum, Penicillium glaucum* or *Bacterium linens.*

8. The process according to claim 6, characterized in that a sunken impression in at least one of the faces is formed by means of a printing draining board bearing, in relief, the graphic pattern, symmetrical with respect to a plane, of the graphic pattern to be impressed.

9. The process according to claim 6 characterized in that a relief impression in at least one of the faces is achieved by means of a printing draining board bearing the sunken graphic pattern, symmetrical with respect to a plane, of the graphic pattern to be impressed.

10. The process of claim 6 characterized in that a sunken impression in the peripheral surface is provided by means of a device embracing the cheese and bearing on its inner part a relief graphic pattern, symmetrical with respect to a plane, of the graphic pattern to be impressed.

11. The process of claim 6 wherein the impressing of the graphic pattern is done before maturing, at an advanced stage of draining.

* * * * *